(12) United States Patent
Fukui (10) Patent No.: US 8,789,123 B2
(45) Date of Patent: Jul. 22, 2014

(54) SYSTEM AND METHOD FOR CONTENT NOTIFICATION AND USER TERMINAL DEVICE

(75) Inventor: Takayuki Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 13/619,718

(22) Filed: Sep. 14, 2012

(65) Prior Publication Data

US 2013/0014194 A1 Jan. 10, 2013

Related U.S. Application Data

(63) Continuation of application No. PCT/JP2012/000472, filed on Jan. 25, 2012.

(30) Foreign Application Priority Data

Jan. 25, 2011 (JP) ................................ 2011-013177

(51) Int. Cl.
*H04N 7/173* (2011.01)
*H04N 21/25* (2011.01)
*H04N 21/472* (2011.01)

(52) U.S. Cl.
CPC ......... *H04N 21/25* (2013.01); *H04N 21/47202* (2013.01)
USPC ........................................................ 725/114

(58) Field of Classification Search
None
See application file for complete search history.

(56) References Cited

U.S. PATENT DOCUMENTS

| | | | |
|---|---|---|---|
| 8,456,314 B2* | 6/2013 | Arling et al. | 340/635 |
| 2001/0004739 A1 | 6/2001 | Sekiguchi et al. | |
| 2008/0226119 A1* | 9/2008 | Candelore et al. | 382/100 |
| 2008/0250451 A1* | 10/2008 | Lee et al. | 725/38 |
| 2008/0279481 A1 | 11/2008 | Ando | |
| 2009/0248676 A1 | 10/2009 | Sasaki | |
| 2009/0313237 A1 | 12/2009 | Agrawal et al. | |
| 2010/0104197 A1 | 4/2010 | Sohma et al. | |
| 2010/0293158 A1 | 11/2010 | Tomita et al. | |
| 2011/0096994 A1 | 4/2011 | Hirai et al. | |

FOREIGN PATENT DOCUMENTS

| | | |
|---|---|---|
| JP | 2000-099534 A | 4/2000 |
| JP | 2001-076001 A | 3/2001 |
| JP | 2003-036267 A | 2/2003 |

(Continued)

OTHER PUBLICATIONS

International Search Report mailed Feb. 28, 2012 issued in corresponding International Application No. PCT/JP2012/000472.

*Primary Examiner* — Oschta Montoya
(74) *Attorney, Agent, or Firm* — McDermott Will & Emery LLP (57) ABSTRACT

Information on content supplied in various forms is monitored for a long period, and a user is notified of the information with a method with which the user can easily remember the information. A content notification system includes: a search key storage server configured to receive image data on content, and store the image data; an information collection server configured to read out the image data from the search key storage server, perform a search through a network based on the image data to find a new form in which the content is supplied, and collect information on the content supplied in the new form; and one or more user terminal devices each configured to receive the image data used for the search from the information collection server and the information, and display the information together with the image data.

7 Claims, 11 Drawing Sheets

(56) References Cited

FOREIGN PATENT DOCUMENTS

| JP | 2008-269628 A | 11/2008 |
| JP | 2009-048716 A | 3/2009 |
| JP | 2010-267094 A | 11/2010 |
| JP | 2011-090476 A | 5/2011 |
| JP | 2011-187001 A | 9/2011 |

* cited by examiner

| | ch1 | ch2 | ch3 | ch4 |
|---|---|---|---|---|
| 9 | Helicopter Heroes<br>Series 4, Episode 18<br>An articulated truck leaves the motorway and overturns, trapping the driver. | Tinga Tinga Tales<br>How Porcupine lost her soft coat and replaced it with quills.<br>Ethelbert the Tiger<br>Series 2, Ethelbert and the Wolf<br>Ethelbert refuses to make up with his brother after a row. | Seven Ages of Britain<br>Spanning from Henry VIII's accession in 1509 to Shakespeare's Henry VIII 100 years later. | Jimi Hendrix: Guitar Hero<br>Documentary about Jimi Hendrix's four sensational years in London at the end of the 1960s. |
| 10 | Homes Under the Hammer<br>Series 13, Episode 65<br>Featuring a bungalow in Derby, a Victorian house in London and a terrace in South Wales. | | In Search of Medieval Britain<br>Alixe Bovey heads west from Gloucester to Wales in the footsteps of Edward I's armies. | Churches: How to Read Them<br>Restoration and Reason<br>How 18th-century churches reflect the excitement and vigour of a turbulent time. |
| 11 | | In the Night Garden<br>Series 1, Where Can Igglepiggle Have a Rest<br>Igglepiggle gets into Upsy Daisy's bed - but only Upsy Daisy is allowed to sleep there! | 112 | In Search of Medieval Britain<br>Wales<br>Alixe Bovey heads west from Gloucester to Wales in the footsteps of Edward I's armies. |
| 12 | Filthy Rotten Scoundrels<br>Episode 13<br>London residents work together with the authorities to catch graffiti vandals. | Car Booty<br>Series 8, Stock<br>Christine Stock and her daughters want to raise 250 pounds so that they can drive a tank. | The Saint and the Hanged Man<br>How a Medieval Catholic court convened to determine a dead bishop's right to sainthood. | The Saint and the Hanged Man<br>How a Medieval Catholic court convened to determine a dead bishop's right to sainthood. |

SYSTEM AND METHOD FOR CONTENT NOTIFICATION AND USER TERMINAL DEVICE

CROSS-REFERENCE TO RELATED APPLICATIONS

This is a continuation of PCT International Application PCT/JP2012/000472 filed on Jan. 25, 2012, which claims priority to Japanese Patent Application No. 2011-013177 filed on Jan. 25, 2011. The disclosures of these applications including the specifications, the drawings, and the claims are hereby incorporated by reference in their entirety.

TECHNICAL FIELD

The present disclosure relates to systems notifying users of search results obtained by searching content which receives attention of the users (hereinafter referred to as user-interested content), e.g., audio/video content (AV content).

BACKGROUND

Content such as movies, television dramas, and music is supplied to users in various forms by various means. Movie content, for example, is distributed through screening in theaters, Internet delivery with a video on demand (VOD) system, sale/rental of package media such as digital versatile discs (DVD) and blu-ray discs (BD), and broadcasting on the airwaves or via satellites, for example. As distributors of such content, there are a large number of distributors including film companies, network companies such as cable television companies, rental business companies, and broadcasting companies. Thus, when the Internet is searched using a keyword concerning user-interested content as a search query, an enormous number of methods for obtaining the content are found. Among the methods, the user needs to access a Web page of a company (e.g., a network company providing a VOD delivery) providing the content in a desired form and make a predetermined registration.

To solve the user's complicated procedure for obtaining content as described above, there is a conventional technique of searching content-related information held by an information management device of each company with a keyword input by a user, classifying the obtained search results according to content forms such as video delivery, medium sale, medium rental, and television broadcasting, and showing the lists of the classified results (see, for example, Japanese Patent Publication No. 2010-267094).

It is difficult with the above-described technique to find content-related information which is not provided yet at the time of a search. For example, if package media are not sold yet at the time of a search, information thereof cannot be obtained. Accordingly, a user has to repeatedly perform searches until information wanted by the user is obtained.

Searches may be automatically repeated with search conditions such as keywords and images being stored. However, in this case, the user might forget the search conditions after a lapse of time. Accordingly, even if information wanted by the user is found much later time and the user is notified of this information, the user might not realize what the information is. This leads to a diminished value of the notified information.

Accordingly, there is a need for a content notification system that can solve the above problems by monitoring information on content supplied in various forms for a long period, and notifying a user of the information with a method with which the user can easily remember the information.

SUMMARY

In one general aspect, the instant application describes a content notification system including: a search key storage server configured to receive image data on content, and store the image data; an information collection server configured to read out the image data from the search key storage server, perform a search through a network based on the image data to find a new form in which the content is supplied, and collect information on the content supplied in the new form; and one or more user terminal devices each configured to receive the image data used for the search from the information collection server and the information, and display the information together with the image data.

In this content notification system, the information collection server monitors information on content to be supplied in a new form. When necessary information is found, the information is displayed on the user terminal device together with image data on the content. Accordingly, the user can easily remember his/her interest in the content by looking at an image as a basis of a search, resulting in that effective use of the notified information.

The information collection server may be configured to send the image data used for the search and the information to a predetermined one of the user terminal devices according to a type of the information. Then, for example, information, such as a notification of rental start, for which it is convenient to receive by a mobile user terminal device is sent to the mobile user terminal device, and broadcast program information for which it is convenient to receive by a stationary user terminal device is sent to the stationary user terminal device.

BRIEF DESCRIPTION OF THE DRAWINGS

The figures depict one or more implementations in accord with the present teaching, by way of example only, not by way of limitations. In the figures, like reference numerals refer to the same or similar elements.

FIG. 11 illustrates an example of an electronic program guide of CS/terrestrial broadcasting.

DETAILED DESCRIPTION

An implementation is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

An inventor provides the following description and the attached drawings to enable those skilled in the art to fully understand the present disclosure. Thus, the description and the drawings are not intended to limit the scope of the subject matter defined in the claims.

Figure 1:
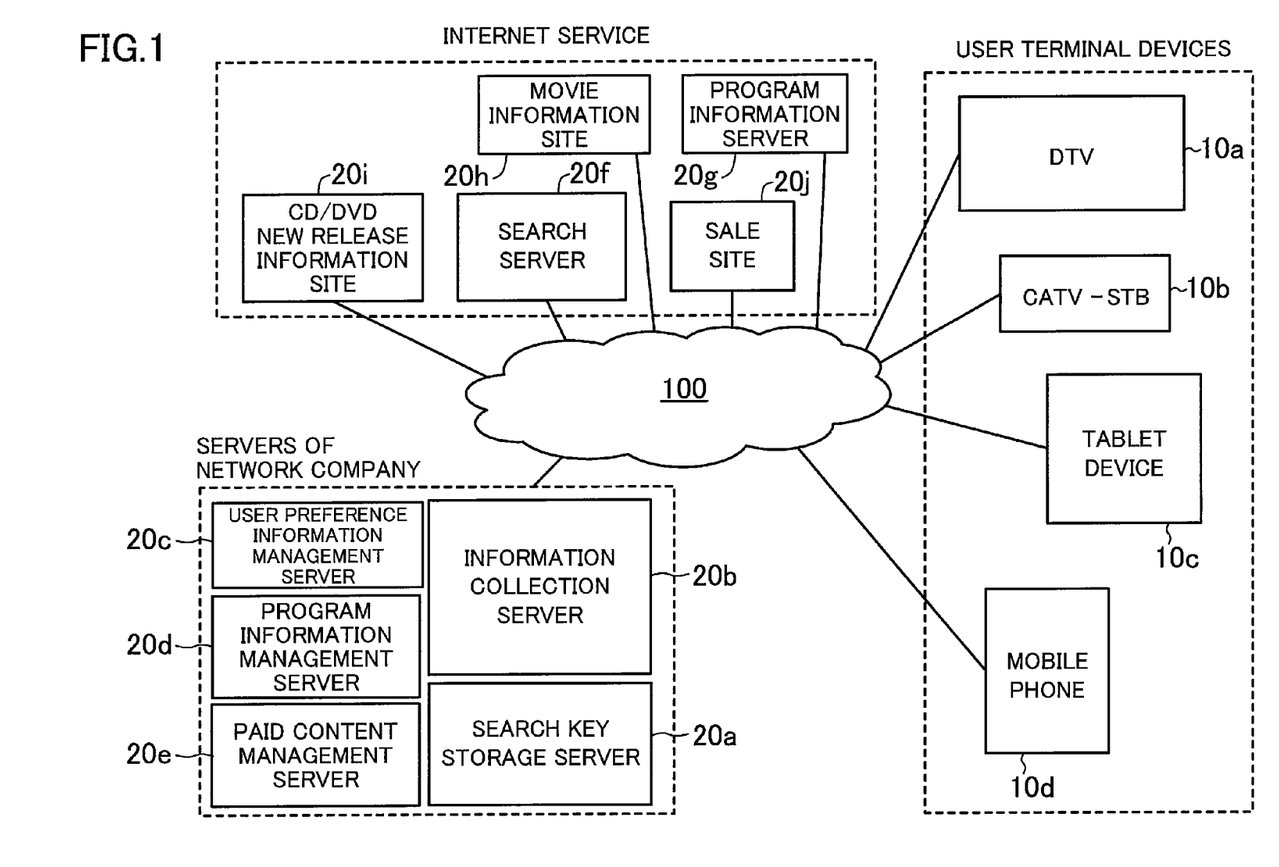
FIG. 1 illustrates a general configuration of a content notification system according to the present disclosure.

FIG. 1 illustrates a general configuration of a content notification system according to the present disclosure. This system is configured by connecting user terminal devices and servers to a network 100 such as the Internet.

The servers include a search key storage server 20a, an information collection server 20b, a user preference information management server 20c, a program information management server 20d, a paid content management server 20e, a search server 20f, a program information server 20g, and a site (a web server) providing various types of information.

The search server 20f is a search engine such as Google® or Yahoo®. The program information server 20g is a server providing, for example, electronic program guide (EPG) data as metadata concerning broadcast programs. Examples of various sites include a movie information site 20h providing various types of information such as titles, performers, and directors of movies to be released, a CD/DVD new release information site 20i providing new release information of CDs and DVDs, and a sale site 20j providing sale information on package media of content. The search engine 20f, the program information server 20g, and the various sites can be freely used as Internet services by many and unspecified users.

On the other hand, the search key storage server 20a, the information collection server 20b, the user preference information management server 20c, the program information management server 20d, and the paid content management server 20e are servers operated by network companies for cable television or the like. Users who hold contracts with these companies can use these servers.

The search key storage server 20a receives a search key regarding content and stores the received search key. The search key is, for example, text information on content or image data of a photograph taken by a user. The photograph includes visual information on user-interested content. For example, for a movie which attracts user's attention to a degree to which the user is interested in but has no intention of watching at a theater, photographs are taken of publicity posters and theater advertising signs seen by the user on the streets, and image data of these photographs are uploaded to the search key storage server 20a. The search key storage server 20a stores the image data uploaded by the user.

The information collection server 20b monitors the tendency of delivery of user-interested content for a relatively long period from several months to several years. For example, for user-interested content, the information collection server 20b monitors whether a VOD delivery has been started or not, whether sale or rental of package media has been started or not, and when the content is broadcasted, for example. Specifically, the information collection server 20b reads out a search key from the search key storage server 20a, and collects information on the user-interested content based on the read-out search key, i.e., by executing a search with the read-out search key used as a search query. The information collection server 20b may irregularly read out a search key from the search key storage server 20a as necessary.

If the search key is image data, the information collection server 20b extracts a keyword from logos and characters included in the image data, and performs a search using the keyword as a search query. A technique for extracting text information from image data is widely known.

The information collection server 20b performs a search with a search engine 20f using the extracted keyword as a search query, and extracts necessary text information from source codes (e.g., hyper text markup language (HTML) source codes) of web pages of a found site. Alternatively, the information collection server 20b may access the program information server 20g to obtain EPG data.

Some types of the search engine 20f can perform a search using image data itself as a search query. In the case of performing a search by using such a search engine 20f, image data itself may be used as a search query.

On the other hand, the user terminal devices include a digital television set 10a, a set-top box 10b for cable television, a tablet device 10c such as a personal digital assistant (PDA) or a notebook PC, and a mobile phone 10d. Among these devices, the digital television set 10a and the set-top box 10b are devices placed in a house, and the tablet device 10c and the mobile phone 10d are devices carried by a user and capable of being used at any place. In the following description, the digital television set 10a and the set-top box 10b will be sometimes generally referred to as stationary user terminal devices, and the tablet device 10c and the mobile phone 10d will be sometimes generally referred to as mobile user terminal devices.

The number of user terminal devices constituting the user terminal devices are not specifically limited. For example, the user terminal devices may include a larger number of user terminal devices, or is constituted by one user terminal device.

The mobile user terminal device can be connected to the network 100 through wireless communication such as Wi-Fi®. In most cases, the mobile user terminal device has an imaging function. Thus, a user can take an image of a publicity poster or the like of interesting content seen on a street with the mobile phone 10d, and upload the image data on the spot to the search key storage server 20a. Some mobile user terminal devices can display content which is supplied to mobile phones and PCs by VOD delivery.

The stationary user terminal device is configured to connect to the network 100 by a wired LAN or a wireless LAN, obtain information from the servers, and display the information. For example, the digital television set 10a and the set-top box 10b can access the program information server 20g, obtain EPG data, and display electronic program guides. The digital television set 10a and the set-top box 10b can also access the program information management server 20d managing original programs of network companies or the paid content management server 20e managing premium content, for example, and display purchase screens of content to be VOD-delivered.

When finding attractive information on user-interested content, such as a VOD delivery start, a rental start of package media, or a broadcast plan, the information collection server 20b sends a search key used as a search query and information thereon to a predetermined user terminal device according to the type of the information. The user terminal device which has received the search key and the information from the information collection server 20b, displays the received information together with the received search key.

Figure 2:
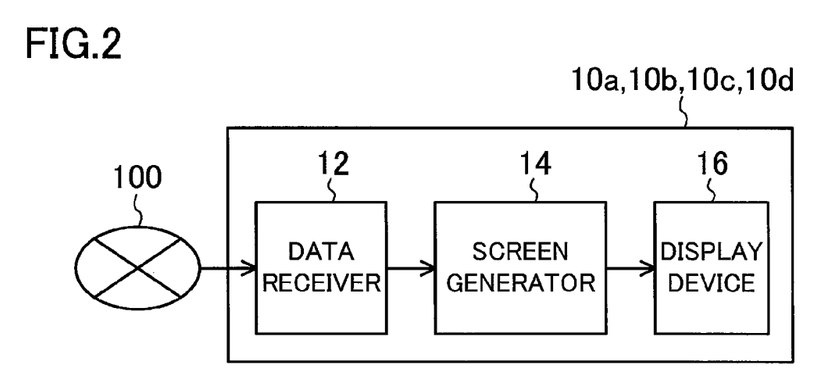
FIG. 2 illustrates a functional block diagram of a user terminal device.

FIG. 2 illustrates major functional blocks in the user terminal devices. In each of the user terminal devices, a data receiver 12 receives a search key regarding content and information on content collected by searching the network using the search key as a search query, from the information collection server 20b through the network 100. A screen generator 14 generates a screen on which the information received by the data receiver 12 is displayed together with the received search key. The generated screen is displayed on a display device 16 such as a plasma display panel or a liquid crystal panel.

It is not efficient to design a screen generator 14 for each user terminal device. To avoid this inefficiency, an abstraction layer is provided in the user terminal devices, and a screen generator 14 is designed for a user interface provided by the abstraction layer. Accordingly, irrespective of the difference of the display device 16 among the user terminal devices, the screen generator 14 can be shared by the user terminal devices.

Figure 3:
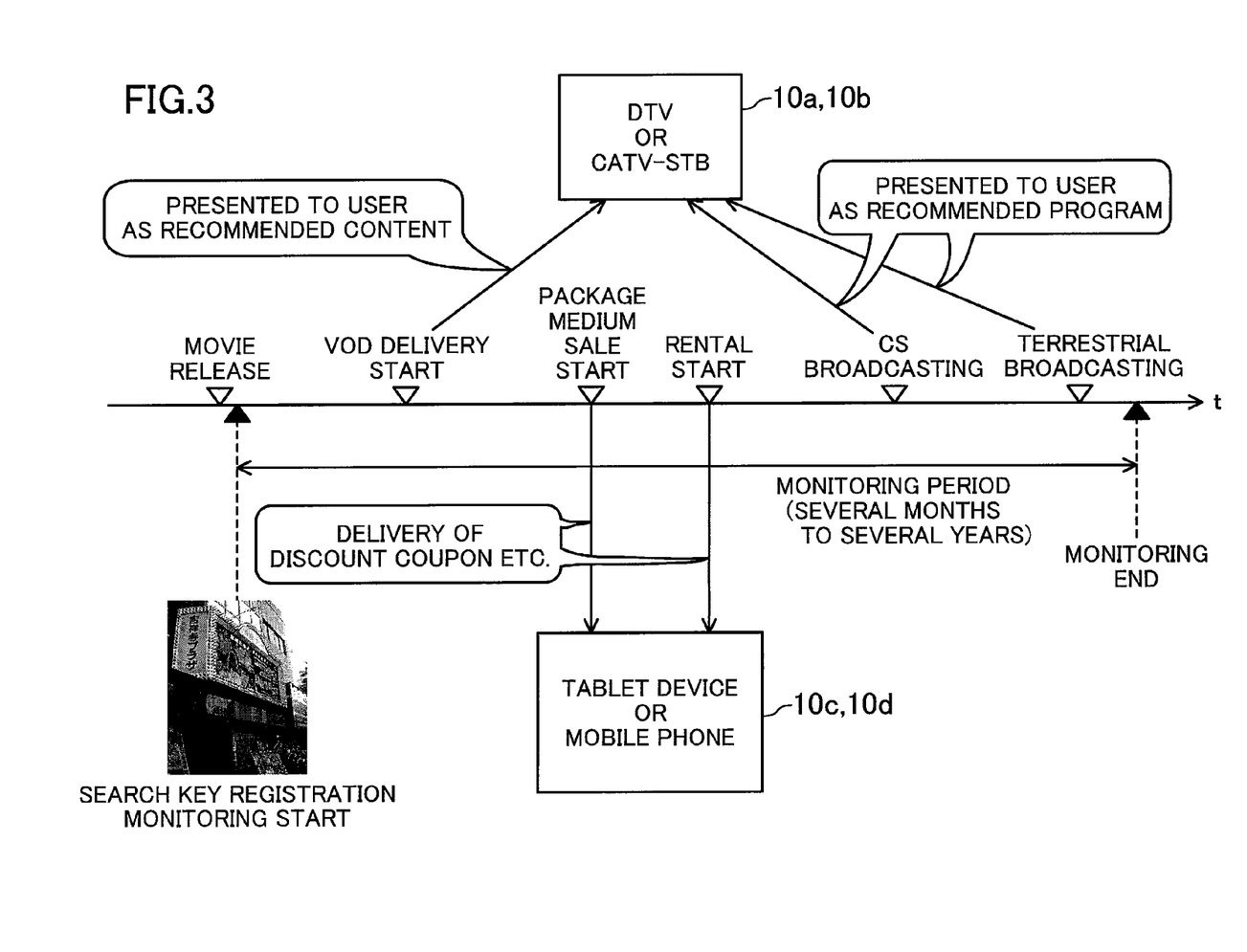
FIG. 3 schematically illustrates an example of notification of information on user-interested movie content by using the content notification system shown in FIG. 1.

FIG. 3 schematically illustrates an example of notification of information on user-interested movie content by using the content notification system of this implementation. For example, in a period of release of a movie, a user takes a picture of a theater advertising sign of the movie, and registers image data thereon in the search key storage server 20a.

When a search key is registered in the search key storage server 20a, automatic monitoring by the information collection server 20b is started. After the release in theaters, the movie is delivered in various forms such as VOD delivery, sale/rental of package media, CS broadcasting (paid broadcasting), terrestrial broadcasting (free broadcasting), or the like, over time. In the case of monitoring until the movie is distributed by terrestrial broadcasting, the monitoring period continues for several years in some cases.

In registering the search key, the user can select items the user wants to be recommended from VOD delivery information, package medium sale/rental information, CS broadcasting information, and terrestrial broadcasting information, and set the selected items in the information collection server 20b. That is, the user can be notified of information needed by the user without being notified of unwanted information.

In registering the search key, a correspondence between information and a user terminal device which is notified of the information can also be set in the information collection server 20b. For example, the digital television set 10a or the set-top box 10b can be notified of information on a VOD delivery start and a broadcast plan, whereas the tablet device 10c or the mobile phone 10d can be notified of information on sale/rental of package media.

For example, suppose the user requests that recommended information for all the items is supplied, and that the stationary user terminal device is notified of information on a VOD delivery and a broadcast plan and the mobile user terminal device is notified of information on a start of sale/rental of package media. Then, when the VOD delivery is started, the stationary user terminal device is notified of user-interested content as recommended content. In the case of CS or terrestrial broadcasting, the stationary user terminal device is notified of user-interested content as recommended programs. When sale/rental of package media is started, a discount coupon for purchase/rental of package media of user-interested content, for example, is delivered to the mobile user terminal device.

The above-described settings may employ default values, or may be changed at every registration of a search key by asking the user. After setting, the user may change the setting at any time.

A processing sequence and display examples of information on the user terminal devices by the content notification system of this implementation will be specifically described hereinafter.

<<VOD Delivery Start>>

Figure 4:
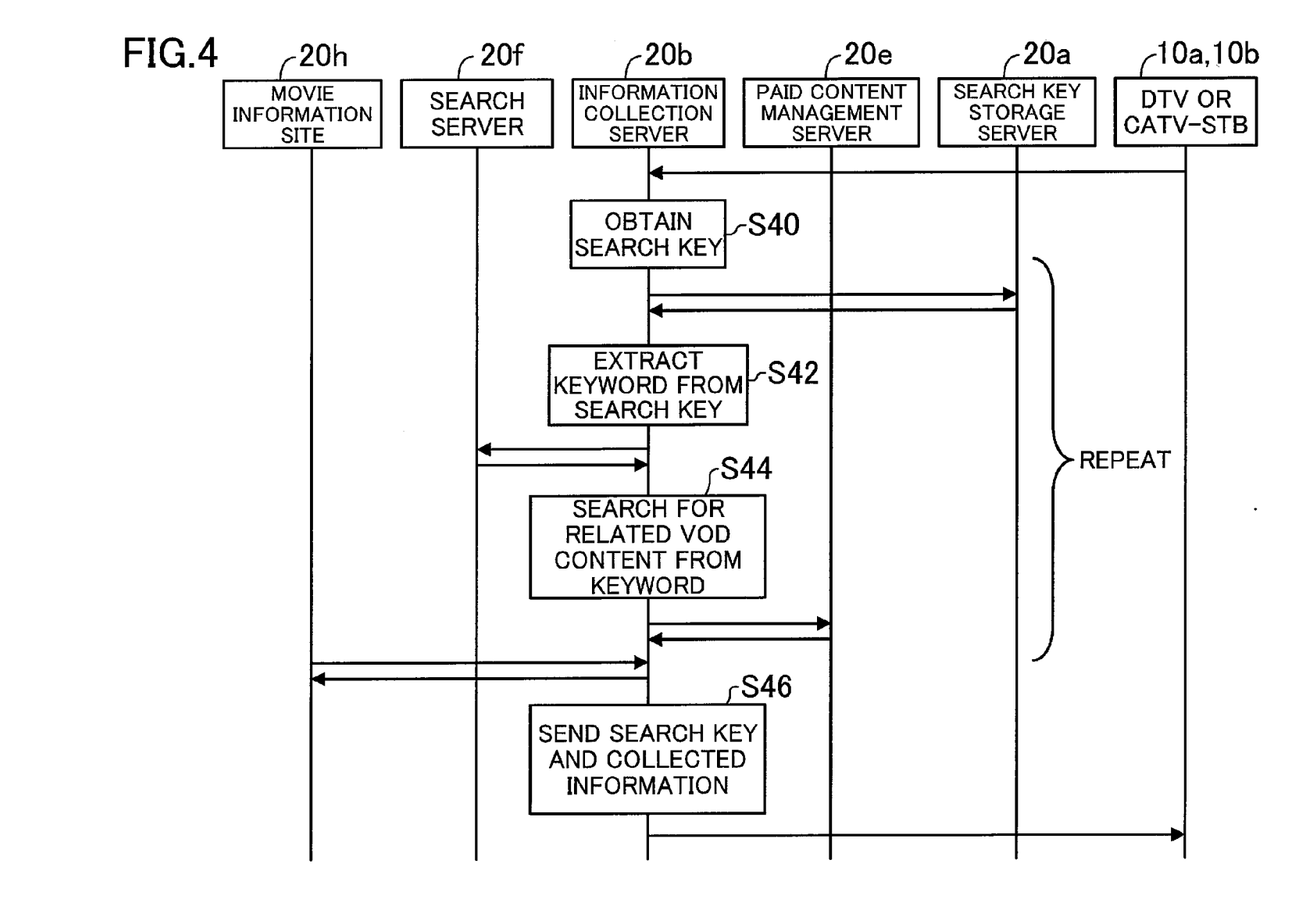
FIG. 4 illustrates a processing sequence in a case where a VOD delivery is started.

FIG. 4 illustrates a processing sequence in a case where a VOD delivery is started. When the stationary user terminal device is powered on, the user terminal device issues a request for obtaining a search key to the information collection server 20b. Upon the request, the information collection server 20b requests the search key from the search key storage server 20a, and obtains the search key (S40).

The information collection server 20b may request a search key from the search key storage server 20a regularly, e.g., daily, weekly, or monthly, or at the time when delivery titles of VOD are updated. Alternatively, the frequency of request of the search key may be reduced daily within a week, and weekly within the subsequent one month, for example, as time goes on after the search key has been registered in the search key storage server 20a.

After obtaining the search key, the information collection server 20b extracts a keyword to be a search query from the obtained search key (S42). For example, the information collection server 20b extracts the title and the names of performers and directors, for example, of the movie.

The information collection server 20b may search for whether the extracted keyword is an interest as a trend word by using the search server 20f. If the extracted keyword is a trend word, the priority of content related to the search key may be increased and the user may be notified of information on the content.

After extracting the keyword from the obtained search key, the information collection server 20b accesses the paid content management server 20e, and performs a search for VOD delivery content related to the keyword, using the extracted keyword as a search query (S44). In this process, the information collection server 20b may ask the paid content management server 20e for history of user's viewing of content to determine whether the user has recently viewed content related to the content found as a result of the search. If the user has viewed the related content, the priority of the content found as a result of the search may be increased so that the user is notified of information on the content.

The information collection server 20b may access the movie information site 20h to determine whether user-interested content is part of a series, and if the content is part of a series, search for whether a previous movie was VOD-delivered or not. If a previous movie which was VOD-delivered is found, the priority of the previous movie may be increased so that the user is notified of information on the movie.

If there are a plurality of pieces of user-interested content, the information collection server 20b repeats steps S40-S44 on each of the pieces of the content. When the search for the user-interested content is finished, the information collection server 20b sends the search key used for the search and collected information to the stationary user terminal device (S46). In this manner, a purchase screen of content to be VOD-delivered is displayed on the stationary user terminal device, while reflecting the search result by the information collection server 20b.

Specifically, the data receiver 12 in the user terminal device receives VOD delivery information from the paid content management server 20e. The VOD delivery information is, for example, the title, title image, and content introduction information, of content supplied from the paid content management server 20e. Based on the VOD delivery information, the screen generator 14 generates a purchase screen of content to be VOD-delivered. In this generation, the screen generator 14 places the search key received from the information collection server 20b in a region of the purchase screen where information on content specified by information received from the information collection server 20b is displayed.

Figure 5:
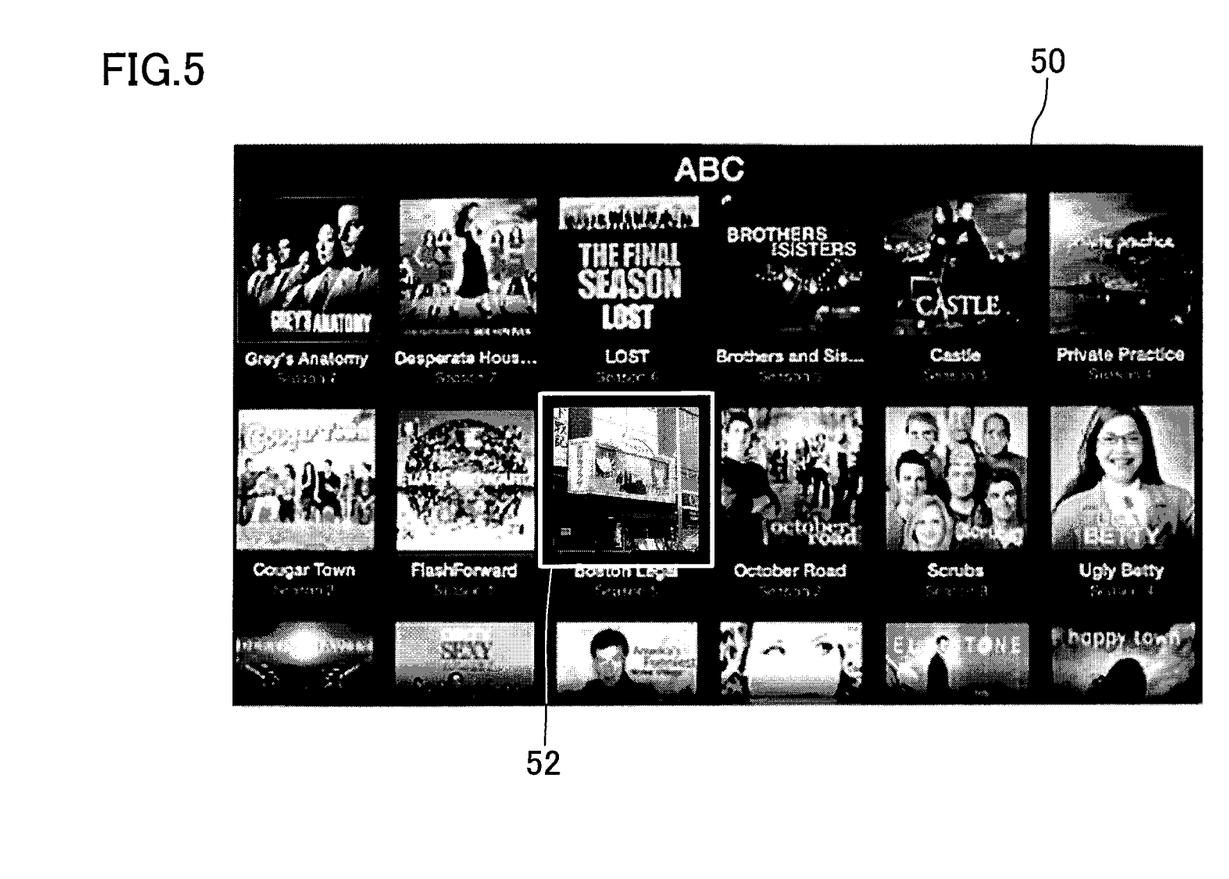
FIG. 5 illustrates an example of a purchase screen of content to be VOD-delivered.

FIG. 5 illustrates an example of a purchase screen of content to be VOD-delivered. A purchase screen 50 is a screen displayed on a display device connected to the digital television set 10a or the set-top box 10b, and shows title images of content to be VOD-delivered. The user can select the title image of content which the user wants to view, and thereby, purchase and view the content.

The information display region 52 is an information display region for user-interested content. The information display region 52 displays a search key registered in the search key storage server 20a, i.e., photographs taken by the user in the past, instead of original title images of the content.

The original title images may be replaced by the photographs when a cursor for selecting content overlaps the information display region 52 on the purchase screen 50. Alternatively, the photographs and the original title images may be alternately displayed at intervals of several seconds.

<<Sale Start of Package Media>>

Figure 6:
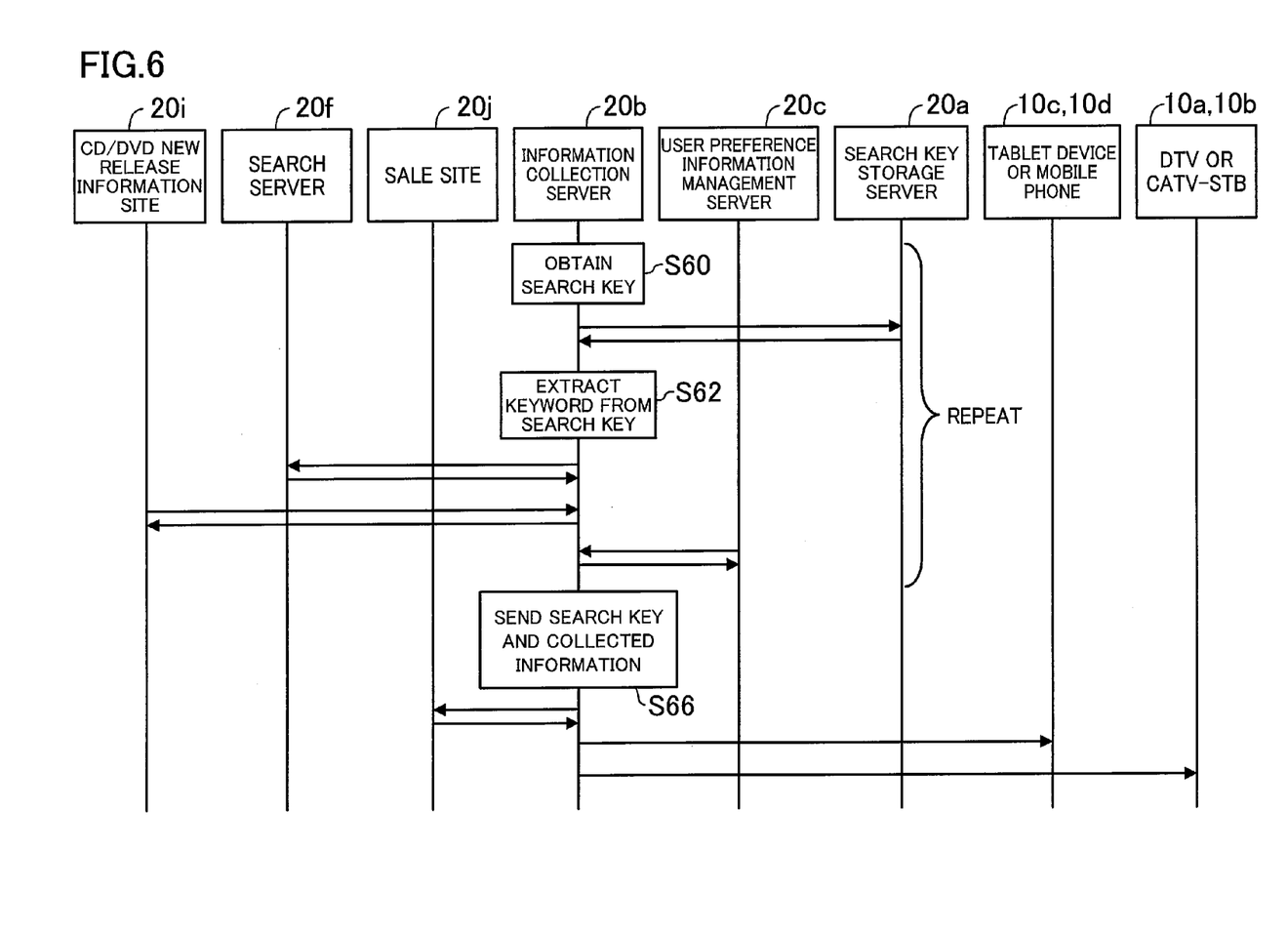
FIG. 6 illustrates a processing sequence in a case where a sale of package media is started.

FIG. 6 illustrates a processing sequence in a case where a sale of package media is started. The information collection server 20b requests a search key from the search key storage server 20a regularly, e.g., daily, weekly, or monthly, and obtains the search key (S60). As described above, the frequency of request of the search key may be reduced as time goes on after the search key has been registered in the search key storage server 20a.

After obtaining the search key, the information collection server 20b extracts a keyword to be a search query from the obtained search key (S62). In this extraction, the information collection server 20b may search for whether the extracted keyword is an interest as a trend word by using the search server 20f. The information collection server 20b may access the CD/DVD new release information site 20i, and conduct a search for a new release with the extracted keyword.

In addition, the information collection server 20b may access the user preference information management server 20c storing preference information of the user, and determine whether or not the extracted keyword matches the name of an actor, for example, the user likes. If the extracted keyword matches the name of an actor the user likes, the priority of content related to the search key may be increased so that the user is notified of information on the content.

If there are a plurality of pieces of user-interested content, the information collection server 20b repeats steps S60-S62 on each of the pieces of the content. When the search for the user-interested content is finished, the information collection server 20b sends the search key used for the search and collected information to the mobile and/or stationary user terminal device(s) (S66). In this manner, a purchase screen of package media is displayed on the stationary user terminal device, while reflecting the search result by the information collection server 20b. On the other hand, the information collection server 20b notifies the mobile user terminal device with an electric mail including link information to the sale site 20j and the search key used for the search.

Figure 7:
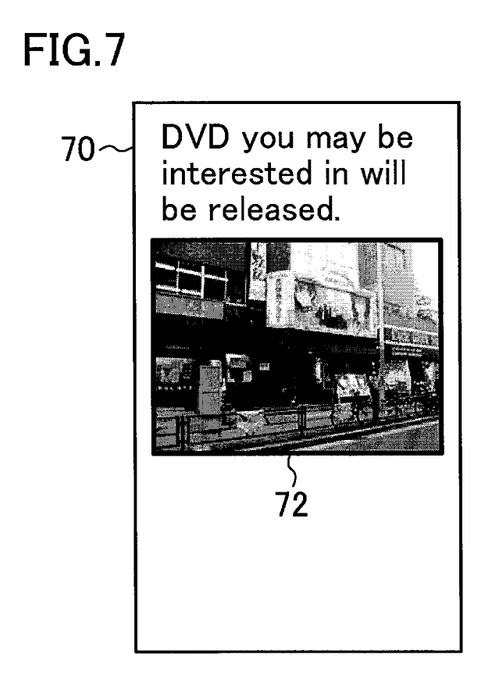
FIG. 7 illustrates an example of a screen indicating a start of sale of package media.

FIG. 7 illustrates an example of a screen indicating a start of sale of package media. A notification screen 70 is a screen displayed on the tablet device 10c or the mobile phone 10d, and showing a search key registered in the search key storage server 20a, i.e., a photograph 72 taken by the user in the past, together with a notification message "DVD you may be interested in will be released." The photograph 72 is linked to the sale site 20j. By clicking the photograph 72, the user can access the sale site 20j, and a reservation/purchase screen of package media of the content is displayed.

<<Rental Start of Package Media>>

Figure 8:
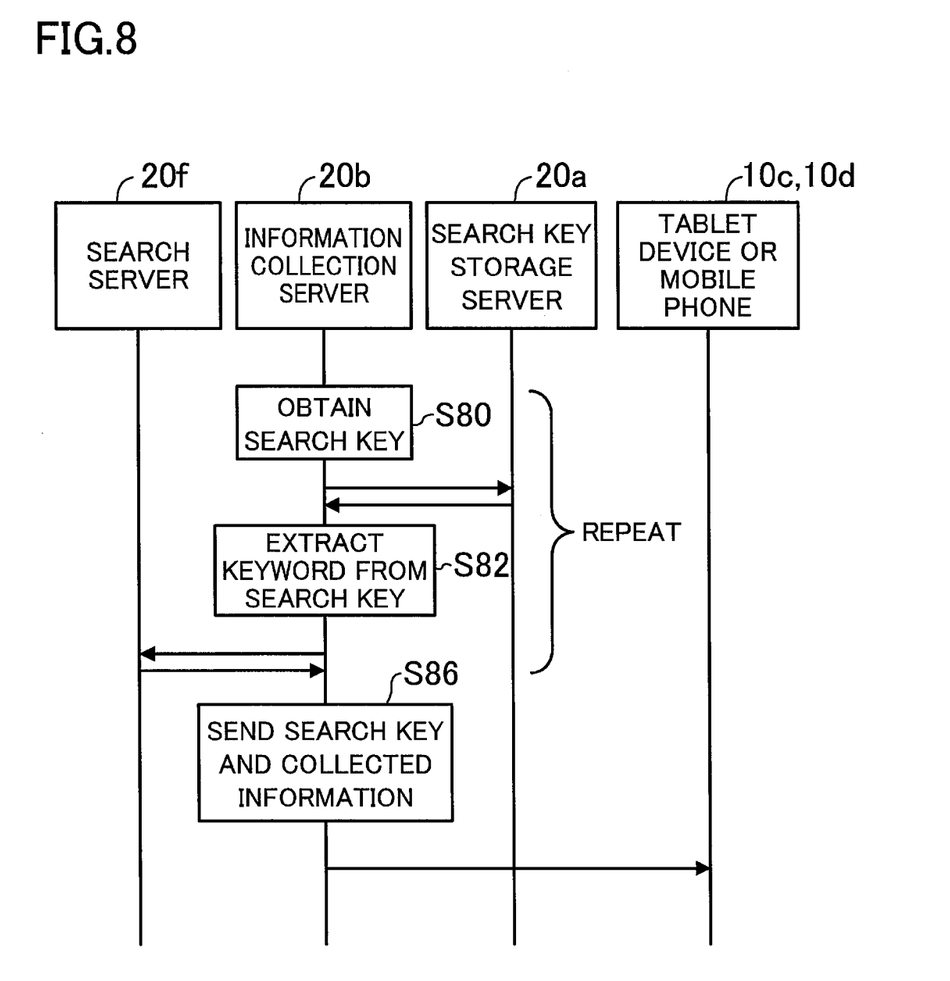
FIG. 8 illustrates a processing sequence in a case where a rental of package media is started.

FIG. 8 illustrates a processing sequence in a case where a rental of package media is started. The information collection server 20b requests a search key for the search key storage server 20a regularly, e.g., daily, weekly, or monthly, and obtains the search key (S80). As described above, the frequency of request of the search key may be reduced as time goes on after the search key has been registered in the search key storage server 20a.

After obtaining the search key, the information collection server 20b extracts a keyword to be a search query from the obtained search key (S82). In this extraction, the information collection server 20b performs an AND search with the extracted keyword and a fixed keyword such as "rental start" by using the search server 20f, and analyzes HTML source codes of web pages of the found site to specify the day of a rental start, for example.

If there are a plurality of pieces of user-interested content, the information collection server 20b repeats steps S80-S82 on each of the pieces of the content. When the search for the user-interested content is finished, the information collection server 20b sends the search key used for the search and collected information to the mobile user terminal device (S86). Specifically, the information collection server 20b notifies the mobile user terminal device with an electric mail including link information to rental shops and the search key used for the search.

Figure 9:
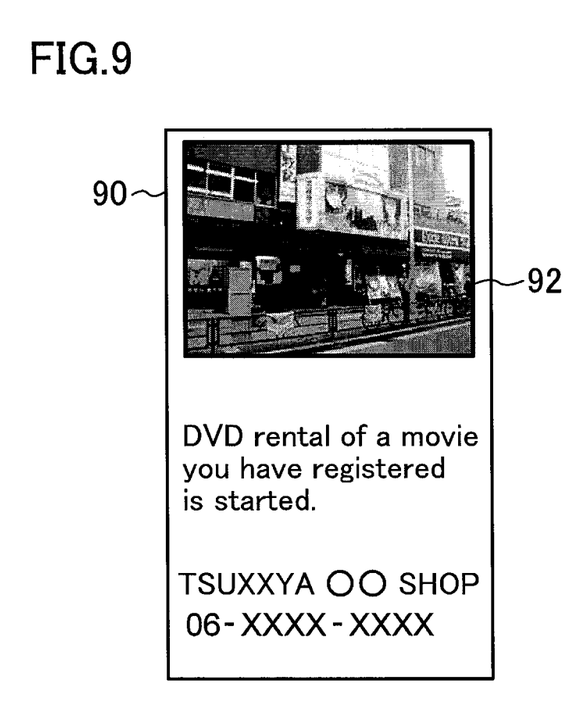
FIG. 9 illustrates an example of a screen indicating a start of rental of package media.

FIG. 9 illustrates an example of a screen indicating a start of rental of package media. A notification screen 90 is a screen displayed on the tablet device 10c or the mobile phone 10d, and shows a search key registered in the search key storage server 20a, i.e., a photograph 92 taken by the user in the past, together with a notification message "DVD rental of a movie you have registered is started" and contact addresses of rental shops.

<<CS/Terrestrial Broadcasting>>

Figure 10:
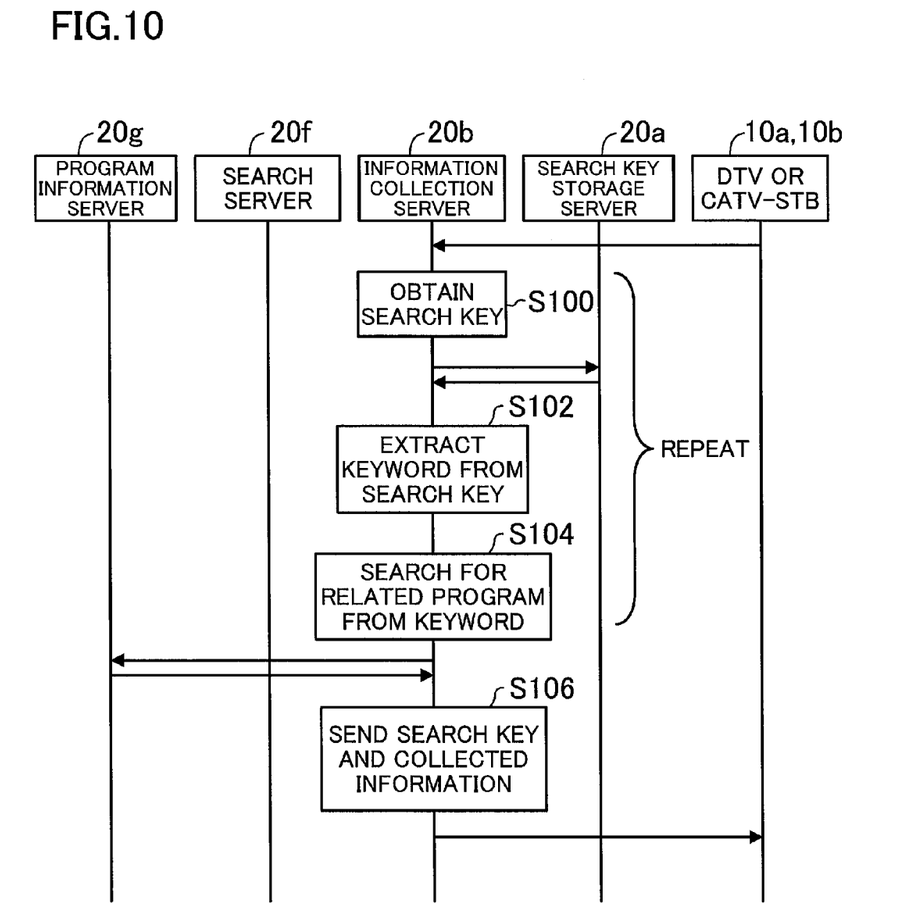
FIG. 10 illustrates a processing sequence in the case of CS/terrestrial broadcasting.

FIG. 10 illustrates a processing sequence in the case of CS/terrestrial broadcasting. When the stationary user terminal device is powered on, the user terminal device issues a request for obtaining a search key to the information collection server 20b. Upon the request, the information collection server 20b requests the search key from the search key storage server 20a, and obtains the search key (S100).

The information collection server 20b may request the search key from the search key storage server 20a regularly, e.g., daily, weekly, or monthly, or at the time when EPG data is updated. Alternatively, the frequency of request of the search key may be reduced daily within a week, and weekly within the subsequent one month, for example, as time goes on after the search key has been registered in the search key storage server 20a.

After obtaining the search key, the information collection server 20b extracts a keyword to be a search query from the obtained search key (S102). For example, the information collection server 20b extracts the title and the names of performers and directors, for example, of a movie.

The information collection server 20b may search for whether the extracted keyword is an interest as a trend word by using the search server 20f. If the extracted keyword is a trend word, the priority of content related to the search key may be increased and the user may be notified of information on the content.

After extracting the obtained search key, the information collection server 20b accesses the program information server 20g, and performs a search for a program to be broadcasted concerning the extracted keyword using the extracted keyword as a search query (S104). If the corresponding program is found, the information collection server 20b obtains information including, for example, broadcast channels, date and time when broadcasting starts, and date and time when broadcasting ends from the program information server 20g.

If there are a plurality of servers providing program information, the information collection server 20b may access all or some of the servers to search for a program to be broadcasted concerning the extracted keyword, using the extracted keyword as a search query. For example, the information collection server 20b may access the program information management server 20d of a network company.

If there are a plurality of pieces of user-interested content, the information collection server 20b repeats steps S100-S104 on each of the pieces of the content. When the search for the user-interested content is finished, the information collection server 20b sends the search key used for the search and collected information to the stationary user terminal device (S106). In this manner, an electronic program guide is displayed on the stationary user terminal device, while reflecting the search result by the information collection server 20b.

Specifically, the data receiver 12 in the user terminal device receives EPG data from the program information server 20g. Based on the EPG data, the screen generator 14 generates an electronic program guide to be displayed. In this generation, the screen generator 14 places the search key received from the information collection server 20b in an information display region for a program specified by the information received from the information collection server 20b in the electronic program guide.

FIG. 11 illustrates an example of an electronic program guide of CS/terrestrial broadcasting. An electronic program guide 110 is a screen displayed on a display device connected to the digital television set 10a or the set-top box 10b, and shows information of programs to be broadcasted. The user can select an interested program, thereby making a reservation of recording of this program. An information display region 112 is an information display region for user-interested content. The information display region 112 displays a search key registered in the search key storage server 20a, i.e., a photograph taken by the user in the past, instead of information on the program.

The photograph may be replaced by original program information when a cursor for selecting a program overlaps the information display region 112 on the electronic program guide 110. Alternatively, the photograph and the original program information may be alternately displayed at intervals of several seconds, or overlap each other.

The foregoing description is directed to the example in which user-interested movie content is provided as AV content in various forms. However, the present disclosure is not limited this example. The user-interested content may be various works of art or public entertainment, and may be supplied in the forms of publication, concerts, exhibitions, or the like. The publication includes electronic books. For example, a user may register images of publicity posters of an interested literary work in a content notification system so that the user can be notified of a new form in which the literary work is supplied together with the image captured by the user in the past in a case where the literary work is released in the form of electronic books, a movie, a television drama, a stage, or the like.

Various implementations have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the implementation described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A content notification system, comprising:
a search key storage server configured to receive image data on content, and store the image data;
an information collection server configured to read out the image data from the search key storage server, perform a search through a network based on the image data to find a new form in which the content is supplied, and collect information on the content supplied in the new form;
one or more user terminal devices each configured to receive the image data used for the search from the information collection server and the information, and display the information together with the image data, and
a paid content management server configured to perform a VOD delivery of content,
wherein the user terminal devices include a specific user terminal device configured to display a purchase screen of content to be VOD-delivered,
the specific user terminal device includes:
a data receiver configured to receive VOD delivery information from the paid content management server, and
a screen generator configured to generate a purchase screen of content to be VOD-delivered based on the VOD delivery information, and
the screen generator is configured to place the image data received from the information collection server, in an information display region for content specified by the information received from the information collection server in the purchase screen.

2. The content notification system of claim 1, wherein the information collection server is configured to send the image data used for the search and the information to a predetermined one of the user terminal devices according to a type of the information.

3. The content notification system of claim 1, wherein the information collection server is configured to extract a keyword from the image data, and performs the search with the keyword.

4. The content notification system of claim 1, wherein the information collection server is configured to read out the image data from the search key storage server irregularly as necessary.

5. A user terminal device, comprising:
a data receiver configured to receive image data on content and information on the content in a new form in which the content is supplied and which is found by a search through a network based on the image data; and
a screen generator configured to generate a screen on which the information is displayed together with the image data, wherein the data receiver is configured to receive VOD delivery information from a paid content management server, and the screen generator is configured to generate a purchase screen of content to be VOD-delivered based on the VOD delivery information, and place the image data in an information display region for content specified by the information in the purchase screen.

6. A content notification method, wherein a search key storage server receives image data on content, and stores the image data, an information collection server reads out the image data from the search key storage server, performs a search through a network based on the image data to find a new form in which the content is supplied, and collects information on the content supplied in the new form, and one or more user terminal devices receive the image data used for the search and the information from the information collection server, and display the information together with the image data, wherein a specific user terminal device included in the user terminal devices performs the steps of:

receiving VOD delivery information from a paid content management server configured to perform a VOD delivery of content, generating a purchase screen of content to be VOD-delivered based on the VOD delivery information, and placing the image data received from the information collection server, in an information display region for content specified by the information received from the information collection server in the purchase screen.

7. The content notification method of claim 6, wherein the information collection server sends the image data used for the search and the information to a predetermined one of the user terminal devices according to a type of the information.

\* \* \* \* \*